United States Patent
Chang

(10) Patent No.: US 8,462,773 B2
(45) Date of Patent: Jun. 11, 2013

(54) DEFAULT GATEWAY, TERMINAL DEVICE, AND METHOD FOR EXCHANGING VOIP SIGNALING

(75) Inventor: Yao-Wen Chang, Tu-Cheng (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 138 days.

(21) Appl. No.: 13/152,288

(22) Filed: Jun. 3, 2011

(65) Prior Publication Data
US 2012/0207152 A1    Aug. 16, 2012

(30) Foreign Application Priority Data
Feb. 10, 2011   (CN) .......................... 2011 1 0036238

(51) Int. Cl.
*H04L 12/66* (2006.01)
(52) U.S. Cl.
USPC ....................................................... 370/356

(58) Field of Classification Search
USPC ................................. 370/356, 352, 401, 351
See application file for complete search history.

(56) References Cited

U.S. PATENT DOCUMENTS
6,847,704 B1 * 1/2005 Cherchali et al. .......... 379/93.05
* cited by examiner

*Primary Examiner* — Dang Ton
*Assistant Examiner* — Kevin Lee
(74) *Attorney, Agent, or Firm* — Altis Law Group, Inc.

(57) ABSTRACT

A terminal device receives a called telephone number inputted by a user. The terminal device generates a called domain name corresponding to the called telephone number according to a predefined rule, and queries the DDNS server for a called IP address that corresponds to the called domain name. The terminal device exchanges VoIP signaling with a called terminal device according to the called IP address when the called IP address is successfully queried from the DDNS server.

14 Claims, 8 Drawing Sheets

DEFAULT GATEWAY, TERMINAL DEVICE, AND METHOD FOR EXCHANGING VOIP SIGNALING

BACKGROUND

1. Technical Field

The present disclosure relates to voice over Internet protocol (VoIP) communications, and more particularly to a default gateway, a terminal device, and a method for exchanging VoIP signaling.

2. Description of Related Art

Voice over Internet protocol (VoIP) is an IP telephony term for a set of facilities used to manage the delivery of voice information over the Internet. A VoIP system often needs one or more media gateway controllers (MGCs) to exchange VoIP signaling. However, the one or more MGCs are very expensive.

Therefore, a heretofore unaddressed need exists in the VoIP system to overcome the aforementioned deficiencies and inadequacies.

BRIEF DESCRIPTION OF THE DRAWINGS

The details of the disclosure, both as to its structure and operation, can be best understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
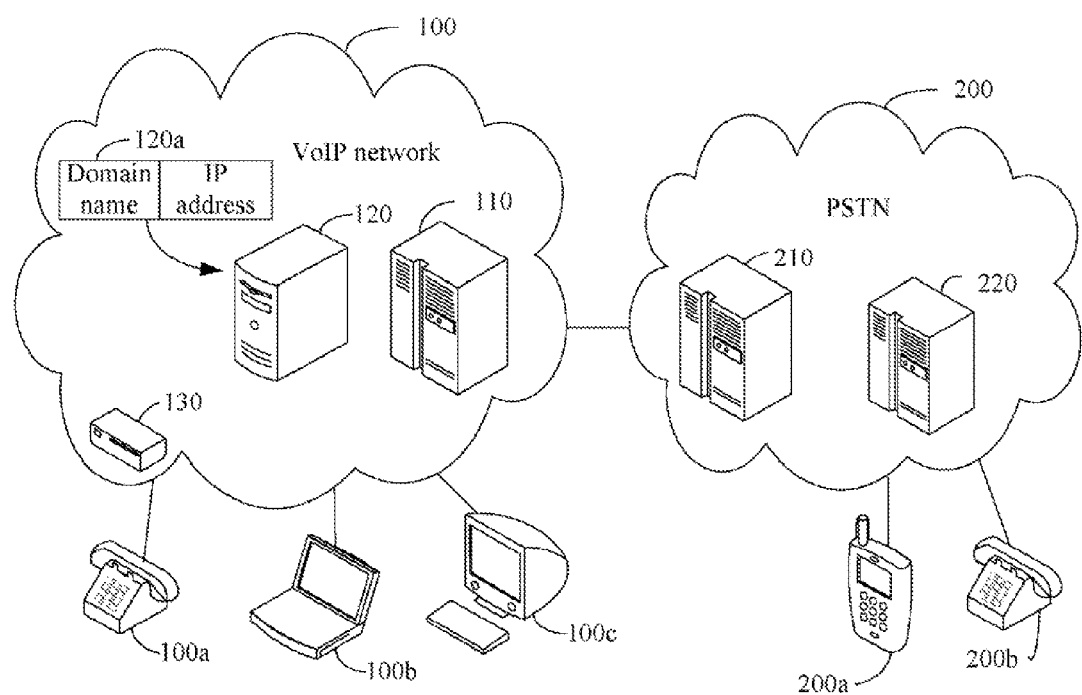
FIG. 1 is a schematic diagram of an application environment of one embodiment of a network communication system including a default gateway and a terminal device in accordance with the present disclosure.

FIG. 1 is a schematic diagram of an application environment of one embodiment of a network communication system in accordance with the present disclosure. In one embodiment, the network communication system includes a voice over Internet protocol (VoIP) network 100 and a public switched telephone network (PSTN) 200. The VoIP network 100 includes a default gateway 110, a dynamic domain name service (DDNS) server 120, and an integrated access device (IAD) 130.

The IAD 130 connects a plurality of terminal devices 100a, 100b, 100c to the VoIP network 100. In one embodiment, the plurality of terminal devices 100a, 100b, 100c may be IP phones, notebook computers, or desktop computers, for example. It should be noted that the plurality of terminal devices 100a, 100b, 100c may be directly connected to the VoIP network 100 not via the IAD 130 if the plurality of terminal devices 100a, 100b, 100c have a function of accessing the VoIP network 100.

The DDNS server 120 includes a mapping table 120a operable to record domain names and IP addresses of the terminal devices 100a, 100b, 100c and the default gateway 110 when the terminal devices 100a, 100b, 100c and the default gateway 110 registers with the DDNS server 120. The mapping table 120a includes a domain name field and an IP address field, respectively operable to record the domain names and the IP addresses of the terminal devices 100a, 100b, 100c and default gateway 110.

The PSTN 200 includes a trunk gateway 210 and a media gateway 220. The trunk gateway 210 is an interface between the VoIP network 100 and the PSTN network 200. The media gateway 220 connects a plurality of terminal devices 200a, 200b to the PSTN network 200.

The plurality of terminal devices 200a, 200b of the PSTN 200 can call the plurality of terminal devices 100a, 100b, 100c of the VoIP network 100 via the media gateway 220, the trunk gateway 210, and the default gateway 110.

In one embodiment, the default gateway 110 generates a domain name of the default gateway 110, and transmits the domain name and an IP address of the default gateway 110 to the DDNS server 120 to register with the DDNS server 120. In one example, the domain name of the default gateway 110 may be "918defaultGW.myvoip.net", and the IP address of the default gateway 110 may be "60.199.244.6".

After receiving the domain name and the IP address of the default gateway 110, the DDNS server 120 determines whether the domain name of the default gateway 110 has a namesake. In one embodiment, the domain name of the default gateway 110 is bought in advance, so the domain name of the default gateway 110 cannot have any namesake. Accordingly, the DDNS server 120 records the domain name and the IP address of the default gateway 110 in the mapping table 120a, and informs the default gateway 110 that the domain name of the default gateway 110 is successfully registered.

Afterwards, the default gateway 110 updates the IP address of the default gateway 110 to the DDNS server 120 when the default gateway 110 either reboots or resumes accessing the VoIP network 100.

Each terminal device 100a, 100b, or 100c generates a telephone number of each terminal device 100a, 100b, or 100c, and generate a domain name corresponding to the telephone number of each terminal device 100a, 100b, or 100c according to a predefined rule. Each terminal device 100a, 100b, or 100c transmits the domain name and the IP address of each terminal device 100a, 100b, or 100c to the DDNS server 120 to register with the DDNS server 120. In one embodiment, each terminal device 100a, 100b, or 100c converts a media access control (MAC) address of each terminal device 100a, 100b, or 100c into the telephone number of each terminal device 100a, 100b, or 100c according to a Hash function. The Hash function is used to obtain the last six number of the MAC address. The predefined rule includes combining one telephone number and a predefined string to form one corresponding domain name. In one embodiment, the predefined string may be ".myvoip.net".

For example, if the MAC addresses of the terminal devices 100a, 100b are respectively 11:12:31:23 and 11:45:64:56, then the telephone numbers of the terminal devices 100a, 100b are respectively 123123 and 456456. If a corresponding area code is 918, then the final telephone numbers of the terminal devices 100a, 100b are respectively 918123123 and 918 456456. Accordingly, the domain names of the terminal devices 100a, 100b may be "918123123.myvoip.net" and "918456456.myvoip.net", respectively.

After receiving the domain name and the IP address of each terminal device 100a, 100b, or 100c, the DDNS server 120 determines whether the domain name of each terminal device 100a, 100b, or 100c has a namesake. In one embodiment, the domain name of each terminal device 100a, 100b, or 100c is generated according to the predefined rule, so the domain name of each terminal device 100a, 100b, or 100c may have a namesake. If the domain name of one terminal device has a namesake, the DDNS server 120 informs the one terminal device that the domain name of the one terminal device is not successfully registered. If the domain name of one terminal device does not have any namesake, the DDNS server 120 records the domain name and the IP address of the one terminal device in the mapping table 120a, and informs the one terminal device that the domain name of the one terminal device is successfully registered.

If the domain name of one terminal device is not successfully registered, the one terminal device increases the telephone number of the one terminal device by a predefined number and updates the domain name of the one terminal device according to the increased telephone number. In one embodiment, the predefined number may be 1. Then the one terminal device transmits the updated domain name and the IP address of the one terminal device to the DDNS server 120 to re-register with the DDNS server 120. The one terminal device keeps increasing the telephone number of the one terminal device by the predefined number and updating the domain name of the one terminal device according to the increased telephone number, until the domain name of the one terminal device is successfully registered.

Afterwards, each terminal device 100a, 100b, or 100c updates the IP address of each terminal device 100a, 100b, or 100c to the DDNS server 120 when each terminal device 100a, 100b, or 100c either reboots or resumes accessing the VoIP network 100.

When one terminal device 100a calls another terminal device 100b within the VoIP network 100, the calling terminal device 100a receives a called telephone number inputted by a user. The called telephone number is the telephone number of the called terminal device 100b. Then, the calling terminal device 100a generates a called domain name corresponding to the called telephone number according to the predefined rule, and queries the DDNS server 120 for a called IP address that corresponds to the called domain name, namely the IP address of the called terminal device 100b. When the called IP address is successfully queried from the DDNS server 120, the calling terminal device 100a exchanges VoIP signaling with the called terminal device 100b according to the called IP address. Then, the calling terminal device 100a can enjoy a VoIP communication with the called terminal device 100b.

When one terminal device 100a of the VoIP network 100 calls another terminal device 200b of the PSTN network 200, the calling terminal device 100a receives a called telephone number inputted by a user. The called telephone number is the telephone number of the called terminal device 200b. Then, the calling terminal device 100a generates a called domain name corresponding to the called telephone number according to the predefined rule, and queries the DDNS server 120 for a called IP address that corresponds to the called domain name, namely the IP address of the called terminal device 200b. The called IP address cannot be successfully queried from the DDNS server 120 because the called terminal device 200b is located in the PSTN 200 and is not registered with the DDNS server 120 of the VoIP network 100. Thus, the calling terminal device 100a continues to query the DDNS server 120 for the IP address of the default gateway 110, and exchanges VoIP signaling with the default gateway 110 according to the IP address of the default gateway 110. Then, the calling terminal device 100a can enjoy a VoIP communication with the called terminal device 200b via the default gateway 110 over the VoIP network 100 and the PSTN 200.

When one terminal device 200a of the PSTN 200 calls another terminal device 100b of the VoIP network 100 via the default gateway 110, the default gateway 110 receives a called telephone number from the calling terminal device 200a via the media gateway 220 and the trunk gateway 210. The called telephone number is the telephone number of the called terminal device 100b. Then, the default gateway 110 generates a called domain name corresponding to the called telephone number according to the predefined rule, and queries the DDNS server 120 for a called IP address that corresponds to the called domain name, namely the IP address of the called terminal device 100b. When the called IP address is successfully queried from the DDNS server 120, the default gateway 110 exchanges VoIP signaling with the called terminal device 100b according to the called IP address. Then, the calling terminal device 200a can enjoy a VoIP communication with the called terminal device 100b via the default gateway 110 over the VoIP network 100 and the PSTN 200.

It should be noted that the called IP addresses corresponding to the called domain names that are successfully queried from the DDNS server 120 can be stored in a cache of the default gateway 110 or the terminal devices 100a, 100b. Thus, the default gateway 110 or the terminal devices 100a, 100b does not need to re-query the DDNS server 120 for the same called IP addresses that correspond to the same called domain names.

In general, each of the default gateway 110 and the terminal devices 100a, 100b can exchange VoIP signaling with a called terminal device without any media gateway controller (MGC), so the cost is reduced.

Figure 2:
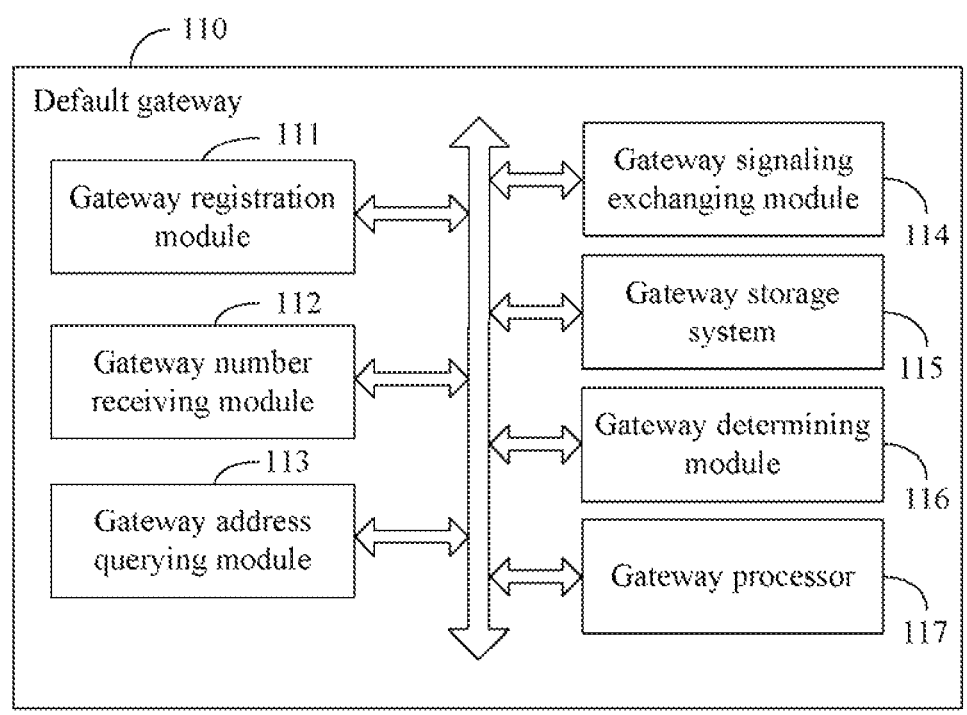
FIG. 2 is a schematic diagram of one embodiment of the default gateway including functional modules.

FIG. 2 is a schematic diagram of one embodiment of the default gateway 110 including functional modules. In one embodiment, the default gateway 110 includes a gateway registration module 111, a gateway number receiving module 112, a gateway address querying module 113, a gateway signaling exchanging module 114, a gateway storage system 115, a gateway determining module 116, and a gateway processor 117.

The modules 111-114 and 116 may comprise computerized code in the form of one or more programs that are stored in the gateway storage system 115. The computerized code includes instructions that are executed by the at least one gateway processor 117 to provide functions for the modules 111-114 and 116. In one example, the gateway storage system 115 may include a hard disk drive, a flash memory, a cache or another computerized memory device.

The gateway registration module 111 is operable to generate a domain name of the default gateway 110, and transmit the domain name and an IP address of the default gateway 110 to the DDNS server 120 to register with the DDNS server 120. After receiving the domain name and the IP address of the default gateway 110, the DDNS server 120 determines whether the domain name of the default gateway 110 has a namesake. In one embodiment, the domain name of the default gateway 110 is bought in advance, so the domain name of the default gateway 110 cannot have any namesake. Accordingly, the DDNS server 120 records the domain name and the IP address of the default gateway 110 in the mapping table 120a of FIG. 1, and informs the default gateway 110 that the domain name of the default gateway 110 is successfully registered.

Afterwards, the gateway registration module 111 updates the IP address of the default gateway 110 to the DDNS server 120 when the default gateway 110 either reboots or resumes accessing the VoIP network 100.

The gateway number receiving module 112 is operable to receive a called telephone number from the PSTN 200. The gateway address querying module 113 is operable to generate a called domain name corresponding to the called telephone number according to a predefined rule, and query the DDNS server 120 for a called IP address that corresponds to the called domain name. In one embodiment, the predefined rule includes combining one telephone number and a predefined string to form one corresponding domain name. In an example, the predefined string may include ".myvoip.net".

The gateway signaling exchanging module 114 is operable to exchange VoIP signaling with the called terminal device according to the called IP address when the called IP address is successfully queried from the DDNS server 120, and reject the called telephone number to the PSTN 200 when the called IP address is not successfully queried from the DDNS server 120.

The gateway storage system 115 may comprise a plurality of history called IP addresses corresponding to a plurality of history called domain names. The plurality of history called IP addresses are successfully queried from the DDNS server 120. The gateway determining module 116 is operable to determine whether the called IP address corresponding to the called domain name is found in the gateway storage system 115, and obtain the called IP address from the gateway storage system 115.

Figure 3:
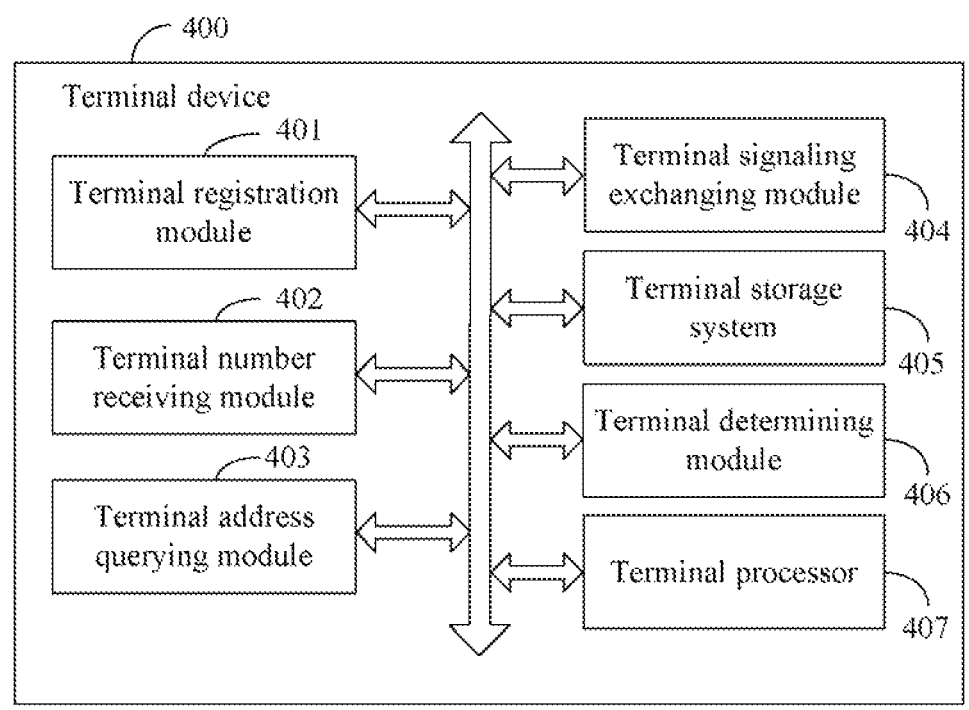
FIG. 3 is a schematic diagram of one embodiment of the terminal device in accordance with the present disclosure.

FIG. 3 is a schematic diagram of one embodiment of a terminal device 400 including functional modules. In one embodiment, the terminal device 400 may be nay one of the terminal devices 100a, 100b, 100c of FIG. 1. The terminal device 400 includes a terminal registration module 401, a terminal number receiving module 402, a terminal address querying module 403, a terminal signaling exchanging module 404, a terminal storage system 405, a terminal determining module 406, and a terminal processor 407.

The modules 401-404 and 406 may comprise computerized code in the form of one or more programs that are stored in the terminal storage system 405. The computerized code includes instructions that are executed by the at least one terminal processor 407 to provide functions for the modules 401-404 and 406. In one example, the terminal storage system 405 may include a hard disk drive, a flash memory, a cache or another computerized memory device.

The terminal registration module 401 is operable to generate a telephone number of the terminal device 400, and generate a domain name corresponding to the telephone number of the terminal device 400 according to a predefined rule. The terminal registration module 401 further transmits the domain name and an IP address of the terminal device 400 to the DDNS server 120 to register with the DDNS server 120. In one embodiment, the terminal registration module 401 converts an MAC address of the terminal device 400 into the telephone number of the terminal device 400 according to a Hash function. The predefined rule includes combining one telephone number and a predefined string to form one corresponding domain name. In one example, the predefined string may be ".myvoip.net".

The terminal registration module 401 further increases the telephone number of the terminal device 400 by a predefined number such as 1 when the domain name of the terminal device 400 is not successfully registered. The terminal registration module 401 further updates the domain name of the terminal device 400 according to the increased telephone number, and transmits the updated domain name and the IP address of the terminal device 400 to the DDNS server 120 to re-register with the DDNS server 120.

The terminal registration module 401 further updates the IP address of the terminal device 400 to the DDNS server 120 when the terminal device 400 either reboots or resumes accessing the VoIP network 100.

The terminal number receiving module 402 is operable to receive a called telephone number of a called terminal device inputted by a user. In one embodiment, the called terminal device may be one of the terminal devices 100a, 100b, 100c located in the VoIP network 100, or one of the terminal devices 200a, 200b located in the PSTN 200.

The terminal address querying module 403 is operable to generate a called domain name corresponding to the called telephone number according to the predefined rule, and query the DDNS server 120 for a called IP address that corresponds to the called domain name. In one embodiment, the called IP address is successfully queried from the DDNS server 120 when the called terminal device is one of the terminal devices 100a, 100b, 100c located in the VoIP network 100. The called IP address cannot be successfully queried from the DDNS server 120 when the called terminal device is one of the terminal devices 200a, 200b located in the PSTN 200.

The terminal signaling exchanging module 404 is operable to exchange VoIP signaling with the called terminal device according to the called IP address when the called IP address is successfully queried from the DDNS server 120. Then, the terminal device 400 can enjoy a VoIP communication with the called terminal device located in the VoIP network 100.

The terminal address querying module 403 is further operable to query the DDNS server 120 for the IP address of the default gateway 110 when the called IP address is not successfully queried from the DDNS server 120. The terminal signaling exchanging module 404 is further operable to exchange VoIP signaling with the default gateway 110 according to the IP address of the default gateway 110. Then, the terminal device 400 can enjoy a VoIP communication with the called terminal device located in the PSTN 200 via the default gateway 110 over the VoIP network 100 and the PSTN 200.

The terminal storage system 405 may comprise a plurality of history called IP addresses corresponding to a plurality of history called domain names, and the plurality of history called IP addresses are successfully queried from the DDNS server 120. The terminal determining module 406 is operable to determine whether the called IP address corresponding to the called domain name is found in the terminal storage system 405, and obtain the called IP address from the terminal storage system 405 when the called IP address corresponding to the called domain name is found in the terminal storage system 405.

Figure 4:
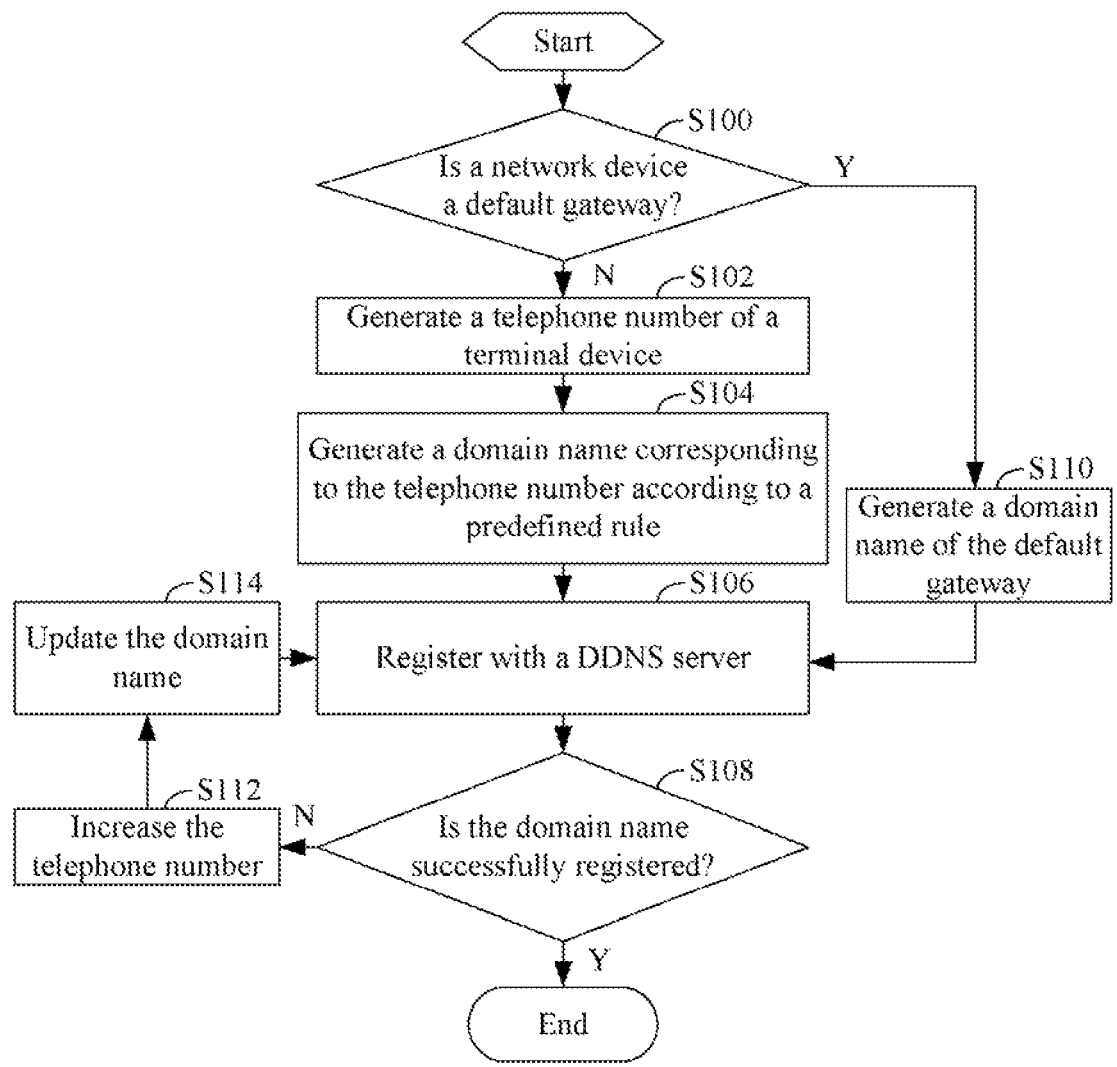
FIG. 4 is a flowchart of one embodiment of a registration method of the default gateway and the terminal device in accordance with the present disclosure.

FIG. 4 is a flowchart of one embodiment of a registration method of the default gateway 110 and the terminal device 400 in accordance with the present disclosure. In one embodiment, the default gateway 110 and the terminal device 40 are called as a network device in order to clearly describe the registration method of FIG. 4.

In block S100, the network device determines whether the network device is the default gateway 110 or the terminal device 400.

If the network device is the terminal device 400, in block S102, the terminal device 400 generates a telephone number of the terminal device 400. In one embodiment, the terminal device 400 converts a MAC address of the terminal device 400 into the telephone number of the terminal device 400 according to a Hash function. The Hash function is used to obtain the last six number of the MAC address. For example, if the MAC addresses of the terminal device 400 is 11:12:31:23, then the telephone number of the terminal device 400 is 123123. If a corresponding area code is 918, then the final telephone numbers of the terminal device 400 is 918123123.

In block S104, the terminal device 400 generates a domain name corresponding to the telephone number of the terminal device 400 according to a predefined rule. In one embodiment, the predefined rule includes combining one telephone number and a predefined string to form one corresponding domain name. In one example, if the telephone number of the terminal device 400 and the predefined string are respectively 918123123 and ".myvoip.net", then the domain name of the terminal device 400 is "918123123.myvoip.net".

In block S106, the terminal device 400 transmits the domain name and the IP address of the terminal device 400 to the DDNS server 120 to register with the DDNS server 120.

After receiving the domain name and the IP address of the terminal device 400, the DDNS server 120 determines whether the domain name of the terminal device 400 has a namesake. In one embodiment, the domain name is generated according to the predefined rule, so the domain name of the terminal device 400 may have a namesake. If the domain name of the terminal device has a namesake, the DDNS server 120 informs the terminal device 400 that the domain name of the terminal device is not successfully registered. If the domain name of the terminal device 400 does not have any namesake, the DDNS server 120 records the domain name and the IP address of the terminal device 400 in the mapping table 120a, and informs the terminal device 400 that the domain name of the terminal device 400 is successfully registered.

In block S108, the terminal device 400 determines whether the domain name of the terminal device 400 is successfully registered.

If the domain name of the terminal device 400 is not successfully registered, in block S112, the terminal device 400 increases the telephone number of the terminal device 400 by a predefined number. In one embodiment, the predefined number may be one.

In block S114, the terminal device 400 updates the domain name of the terminal device 400 according to the increased telephone number.

Going back S106, the terminal device 400 transmits the updated domain name and the IP address of the terminal device 400 to the DDNS server 120 to re-register with the DDNS server 120. The terminal device 400 keeps increasing the telephone number of the terminal device by the predefined number and updating the domain name of the terminal device 400, until the domain name of the terminal device 400 is successfully registered.

Afterwards, the terminal device 400 updates the IP address of the terminal device 400 to the DDNS server 120 when the terminal device 400 either reboots or resumes accessing the VoIP network 100.

If the determination result of block S100 is that the network device is the default gateway 110, in block S110, the default gateway 110 generates a domain name of the default gateway 110 such as 918defaultGW.myvoip.net.

In block S106, the default gateway 110 transmits the domain name and an IP address of the default gateway 110 to the DDNS server 120 to register with the DDNS server 120. In one example, the IP address of the default gateway 110 may be 60.199.244.6.

After receiving the domain name and the IP address of the default gateway 110, the DDNS server 120 determines whether the domain name of the default gateway 110 has a namesake. In one embodiment, the domain name of the default gateway 110 is bought in advance, so the domain name of the default gateway 110 cannot have any namesake. Accordingly, the DDNS server 120 records the domain name and the IP address of the default gateway 110 in the mapping table 120a, and informs the default gateway 110 that the domain name of the default gateway 110 is successfully registered.

Accordingly, in block S108, the default gateway 110 determines that the domain name of the default gateway 110 is successfully registered.

Afterwards, the default gateway 110 updates the IP address of the default gateway 110 to the DDNS server 120 when the default gateway 110 either reboots or resumes accessing the VoIP network 100.

Figure 5:
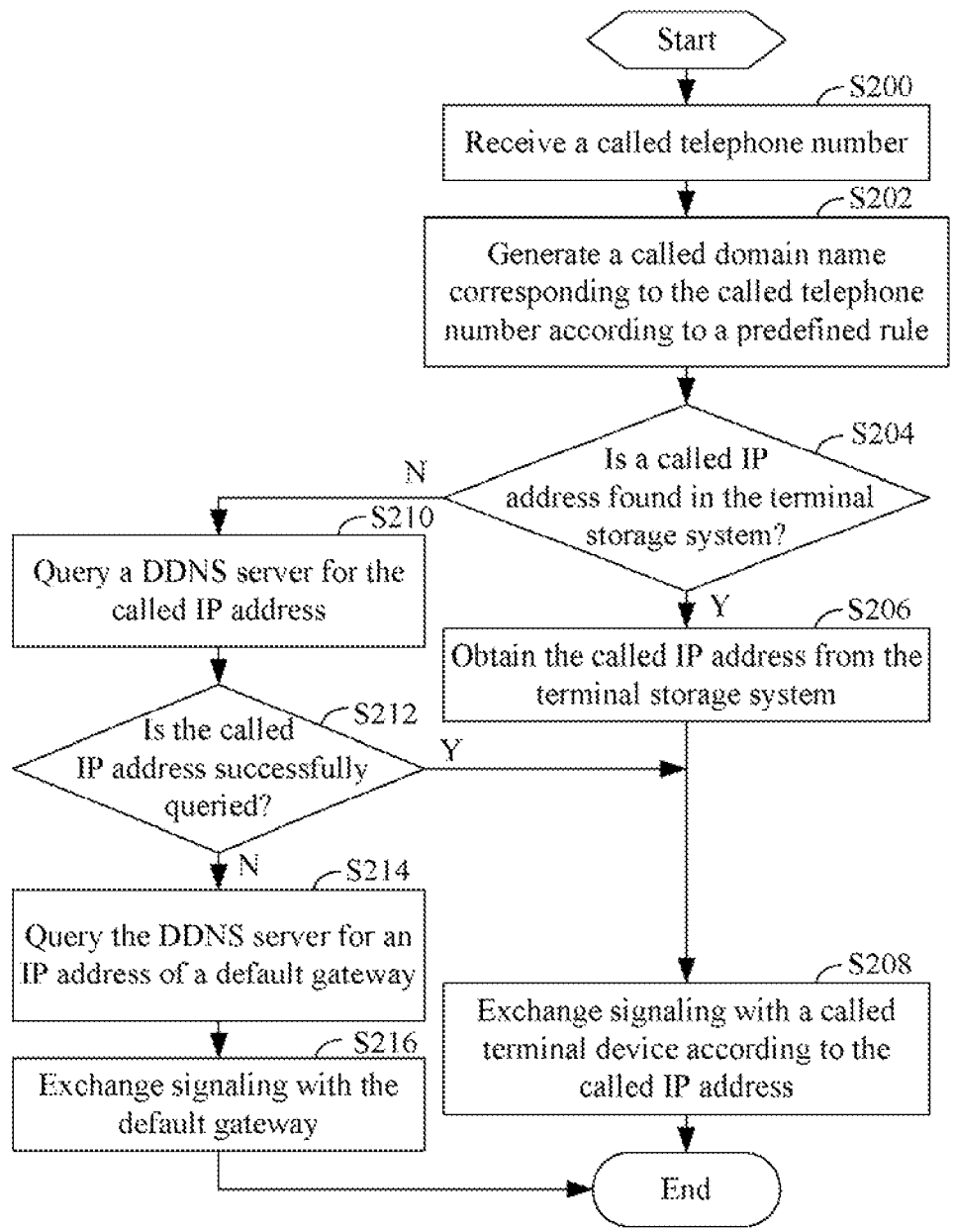
FIG. 5 is a flowchart of one embodiment of a method for exchanging voice over Internet protocol (VoIP) signaling of the terminal device in accordance with the present disclosure.

FIG. 5 is a flowchart of one embodiment of a method for exchanging VoIP signaling of the terminal device 100a in accordance with the present disclosure. In one embodiment, the terminal device 100a of the VoIP network 100 calls the terminal device 100b of the VoIP network 100, or calls the terminal device 200b of the PSTN 200.

In block S200, the terminal device 100a receives a called telephone number inputted by a user. The called telephone number is the telephone number of the called terminal device 100b or 200b.

In block S202, the terminal device 100a generates a called domain name corresponding to the called telephone number according to a predefined rule. In one embodiment, the predefined rule includes combining the called telephone number with a predefined string such as ".myvoip.net" to from the called domain name. For example, if the called telephone number is 918456456, then the called domain name is 918456456.myvoip.net.

In block S204, the terminal device 100a determines whether a called IP address corresponding to the called telephone number is found in the terminal storage system 405 of FIG. 3.

If the called IP address is found in the terminal storage system 405, in block S206, the terminal device 100a obtains the called IP address from the terminal storage system 405.

If the called IP address is not found in the terminal storage system 405, in block S210, the terminal device 100a queries the DDNS server 120 for the called IP address that corresponds to the called domain name.

In block S212, the terminal device 100a determines whether the called IP address is successfully queried from the DDNS server 120. In one embodiment, if the called terminal device is the terminal device 100b of the VoIP network 100, the called IP address can be successfully queried from the DDNS server 120. If the called terminal device is the terminal device 200b of the PSTN 200, the called IP address cannot be successfully queried from the DDNS server 120 because the terminal device 200b of the PSTN 200 does not register with the DDNS server 120.

If the called IP address is successfully queried from the DDNS server 120, in block S208, the terminal device 100a exchanges VoIP signaling with the called terminal device 100b according to the called IP address. Then, the terminal device 100a can enjoy a VoIP communication with the called terminal device 100b.

If the called IP address is not successfully queried from the DDNS server 120, in block S214, the terminal device 100a queries the DDNS server 120 for an IP address of the default gateway 110.

In block S216, the terminal device 100a exchanges VoIP signaling with the default gateway 110 according to the IP address of the default gateway 110. Then, the terminal device 100a can enjoy a VoIP communication with the called terminal device 200b via the default gateway 110 over the VoIP network 100 and the PSTN 200.

Figure 6:
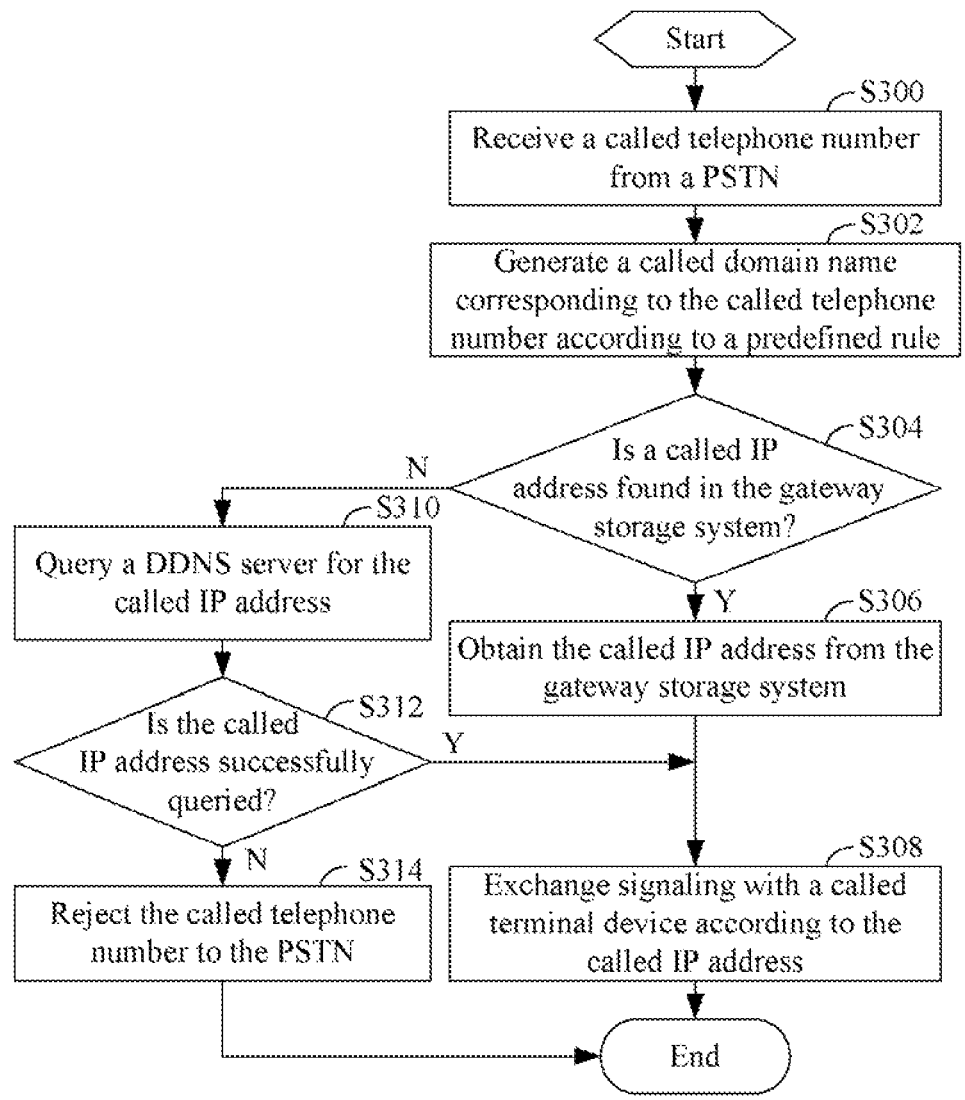
FIG. 6 is a flowchart of one embodiment of a method for exchanging VoIP signaling of the default gateway in accordance with the present disclosure.

FIG. 6 is a flowchart of one embodiment of a method for exchanging VoIP signaling of the default gateway 110 in accordance with the present disclosure. In one embodiment, the terminal device 200a of the PSTN 200 calls the terminal device 100b of the VoIP network 100 via the default gateway 110.

In block S300, the default gateway 110 receives a called telephone number from the PSTN 200. In detail, the default gateway 110 receives the called telephone number from the calling terminal device 200a via the media gateway 220 and the trunk gateway 210. The called telephone number is the telephone number of the called terminal device 100b.

In block S302, the default gateway 110 generates a called domain name corresponding to the called telephone number according to a predefined rule In block S304, the default gateway 110 determines whether a called IP address corresponding to the called domain name is found in the gateway storage system 115.

If the called IP address is found in the gateway storage system 115, in block S306, the default gateway 110 obtains the called IP address from the gateway storage system 115.

If the called IP address is not found in the gateway storage system 115, in block S310, the default gateway 110 queries the DDNS server 120 for the called IP address that corresponds to the called domain name, namely the called IP address of the called terminal device 100b.

If the called IP address is successfully queried from the DDNS server 120, in block S308, the default gateway 110 exchanges VoIP signaling with the called terminal device 100b according to the called IP address. Then, the calling terminal device 200a can enjoy a VoIP communication with the called terminal device 100b via the default gateway 110 over the VoIP network 100 and the PSTN 200.

If the called IP address is not successfully queried from the DDNS server 120, in block S314, the default gateway 110 rejects the called telephone number to the PSTN 200.

Figure 7:
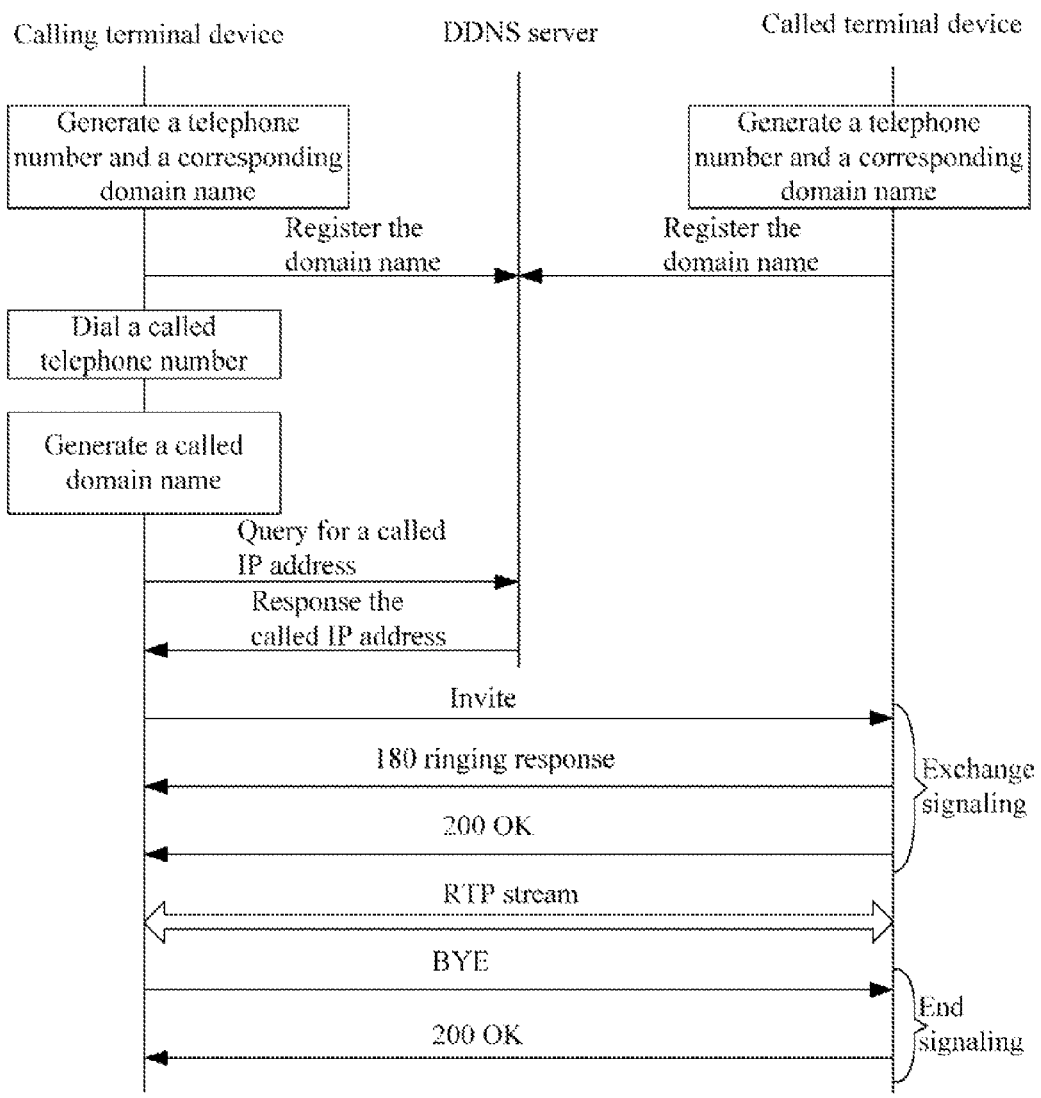
FIG. 7 is a transport diagram of one embodiment of a method for exchanging VoIP signaling in accordance with the present disclosure.

FIG. 7 is a transport diagram of one embodiment of a method for exchanging VoIP signaling in accordance with the present disclosure. In one embodiment, one terminal device 100a calls another terminal device 100b within the VoIP network 100.

Initially, the calling terminal device 100a generates a telephone number of the calling terminal device 100a, and generates a domain name corresponding to the telephone number of the calling terminal device 100a according to a predefined rule. For example, if the telephone number of the calling terminal device 100a is 918123123, then the corresponding domain name of the calling terminal device 100a is 918123123.myvoip.net.

Simultaneously, the called terminal device 100b generates a telephone number of the called terminal device 100b, and generates a domain name corresponding to the telephone number of the called terminal device 100b according to the predefined rule. For example, if the telephone number of the called terminal device 100b is 918456456, then the corresponding domain name of the called terminal device 100b is 918456456.

Afterwards, the calling terminal device 100a transmits the domain name and an IP address of the calling terminal device 100a to the DDNS server 120 to register with the DDNS server 120. For example, if the IP address of the calling terminal device 100a is 210.59.230.60, then the calling terminal device 100a transmits 918123123.myvoip.net and 210.59.230.60 to the DDNS server 120 to register with the DDNS server 120.

Simultaneously, the called terminal device 100b transmits the domain name and the IP address of the called terminal device 100b to the DDNS server 120 to register with the DDNS server 120. For example, if the IP address of the called terminal device 100b is 119.16.245.23, then the called terminal device 100b transmits 981456456.myvoip.net and 119.160.246.23 to the DDNS server 120 to register with the DDNS server 120.

Then, the calling terminal device 100a dials the called telephone number of the called terminal device 100b, namely 918456456.

Then, the calling terminal device 100a generates the called domain name corresponding to the called telephone number, namely 918456456.myvoip.net, according to the predefined rule.

Afterwards, the calling terminal device 100a queries the DDNS server 120 for the called IP address that corresponds to the called domain name, namely the IP address of the called terminal device 100b.

Then, the calling terminal device 100a receives the called IP address from the DDNS server 120.

Then, the calling terminal device 100a exchanges VoIP signaling with the called terminal device 100b according to the called IP address. In detail, the calling terminal device 100 transmits an invite to the called terminal device 10b, and receives a 180 ringing response and 200 OK from the called terminal device 100b.

Then, the calling terminal device 100a enjoys a VoIP communication with the called terminal device 100b. That is, the calling terminal device 100a transmits real-time transport (RTP) stream to and receives RTP stream from the called terminal device 100b.

When the VoIP communication is ended, the calling terminal device 100a ends the VoIP signaling with the called terminal device 100b. That is, the calling terminal device 100a transmits Bye to the called terminal device 100b, and receives 200 OK from the called terminal device 100b.

Figure 8:
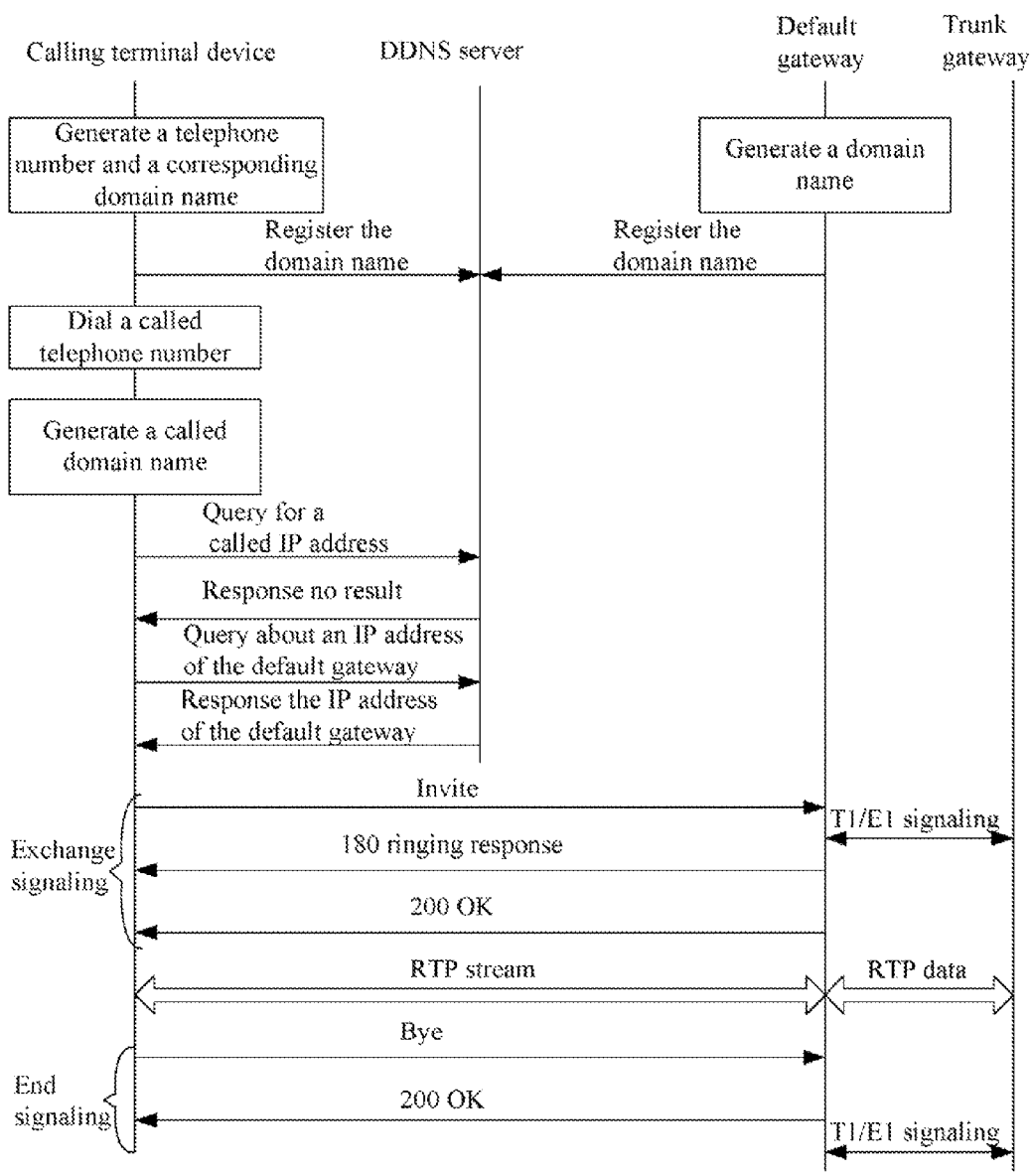
FIG. 8 is a transport diagram of another embodiment of a method for exchanging VoIP signaling in accordance with the present disclosure.

FIG. 8 is a transport diagram of another embodiment of a method for exchanging VoIP signaling in accordance with the present disclosure. In one embodiment, one terminal device 100a of the VoIP network 100 calls another terminal device 200b of the PSTN network 200.

Initially, the calling terminal device 100a generates a telephone number of the calling terminal device 100a, and generates a domain name corresponding to the telephone number of the calling terminal device 100a according to a predefined rule. For example, if the telephone number of the calling terminal device 100a is 918123123, then the corresponding domain name of the calling terminal device 100a is 918123123.myvoip.net.

Afterwards, the calling terminal device 100a transmits the domain name and an IP address of the calling terminal device 100a to the DDNS server 120 to register with the DDNS server 120. For example, if the IP address of the calling terminal device 100a is 210.59.230.60, then the calling terminal device 100a transmits 918123123.myvoip.net and 210.59.230.60 to the DDNS server 120 to register with the DDNS server 120.

Simultaneously, the default gateway 110 generates a domain name of the default gateway 110, and transmits the domain name and an IP address of the default gateway 110 to the DDNS server 120 to register with the DDNS server 120. In one example, if the domain name and the IP address of the default gateway 110 are respectively 918defaultGW.myvoip.net and 119.160.246.23, the default gateway 110 transmits 918defaultGW.myvoip.net and 119.160.246.23 to the DDNS server 120 to register with the DDNS server 120.

Then, the calling terminal device 100a dials the called telephone number of the called terminal device 200b, such as 88622267511.

Afterwards, the calling terminal device 100a generates the called domain name corresponding to the called telephone number, namely 88622267511.myvoip.net, according to the predefined rule.

Afterwards, the calling terminal device 100a queries the DDNS server 120 for the called IP address that corresponds to the called domain name, namely the IP address of the called terminal device 200b.

The DDNS server 120 responses no result to the calling terminal device 100a because the called terminal device 200b does not register with the DDNS server 120.

Then, the calling terminal device 100a queries the DDNS server 120 for the IP address of the default gateway 110, and receives the IP address of the default gateway 110 from the DDNS server 120.

Then, the calling terminal device 100a exchanges VoIP signaling with the default gateway 110 according to the IP address of the default gateway 110. In detail, the calling terminal device 100 transmits an invite to the default gateway 110, and receives a 180 ringing response and 200 OK from the default gateway 110.

Then, the default gateway 110 exchanges T1/E1 signaling with the trunk gateway 210 in order to call the called terminal device 200b.

Then, the calling terminal device 100a enjoys a VoIP communication with the called terminal device 200b via the default gateway 110 and the trunk gateway 210. That is, the calling terminal device 100a transmits RTP stream to and receives RTP stream from the called terminal device 100b via the default gateway 110 and the trunk gateway 210.

When the VoIP communication is ended, the calling terminal device 100a ends the VoIP signaling with the default gateway 110. That is, the calling terminal device 100a transmits Bye to the default gateway 110, and receives 200 OK from the default gateway 110. The default gateway 110 exchanges T1/E1 signaling with the trunk gateway 210 in order to end the VoIP signaling with the called terminal device 200b.

Thus, the default gateway 110 and the terminal devices 100a, 100b, 100c can exchange VoIP signaling without any media gateway controller (MGC), so the cost is reduced.

While various embodiments of the present disclosure have been described above, it should be understood that they have been presented using example and not using limitation. Thus the breadth and scope of the present disclosure should not be limited by the above-described embodiments, but should be defined in accordance with the following claims and their equivalents.

What is claimed is:

1. A default gateway in electronic communication with a plurality of terminal devices and a dynamic domain name service (DDNS) server in a voice over Internet protocol (VoIP) network, each terminal device comprising a telephone number, a corresponding domain name, and a corresponding Internet protocol (IP) address, the default gateway comprising:
   at least one gateway processor; and
   a gateway storage system to store one or more programs executable by the at least one gateway processor, the one or more programs comprising:
      a gateway registration module operable to generate a domain name of the default gateway, and transmit the domain name and an IP address of the default gateway to the DDNS server to register with the DDNS server;
      a gateway number receiving module operable to receive a called telephone number from a public switched telephone network (PSTN), wherein the called telephone number is the telephone number of a called one of the terminal devices in the VoIP network;
      a gateway address querying module operable to generate a called domain name corresponding to the called telephone number according to a predefined rule, and query the DDNS server for a called IP address that corresponds to the called domain name; and
      a gateway signaling exchanging module operable to exchange VoIP signaling with the called terminal device according to the called IP address when the called IP address is successfully queried from the DDNS server, and reject the called telephone number to the PSTN when the called IP address is not successfully queried from the DDNS server;
      wherein the gateway storage system comprises a plurality of history called IP addresses corresponding to a plurality of history called domain names, and the plurality of history called IP addresses are successfully queried from the DDNS server.

2. The default gateway of claim 1, further comprising a gateway determining module operable to determine whether the called IP address corresponding to the called domain name is found in the gateway storage system, and obtain the called IP address from the gateway storage system when the called IP address is found in the gateway storage system.

3. The default gateway of claim 1, wherein the gateway registration module is further operable to update the IP address of the default gateway to the DDNS server when the default gateway either reboots or resumes accessing the VoIP network.

4. The default gateway of claim 1, wherein the predefined rule includes combining the called telephone number and a predefined string to form the called domain name.

5. A terminal device in electronic communication with a plurality of other terminal devices, a default gateway, and a dynamic domain name service (DDNS) server in a voice over Internet protocol (VoIP) network, each of the default gateway and the other terminal devices transmitting a domain name and an IP address of each of the default gateway and the other terminal devices to the DDNS server to register with the DDNS server, the terminal device comprising:
   at least one terminal processor; and
   a terminal storage system to store one or more programs that are executed by the at least one terminal processor, the one or more programs comprising:
      a terminal registration module operable to generate a telephone number of the terminal device, generate a domain name corresponding to the telephone number of the terminal device according to a predefined rule, and transmit the domain name and an IP address of the terminal device to the DDNS server to register with the DDNS server;

a terminal number receiving module operable to receive a called telephone number of a called terminal device inputted by a user;

a terminal address querying module operable to generate a called domain name corresponding to the called telephone number according to the predefined rule, and query the DDNS server for a called IP address that corresponds to the called domain name, wherein the called IP address is successfully queried from the DDNS server when the called terminal device is one of the other terminal devices in the VoIP network, and is not successfully queried from the DDNS server when the called terminal device is not in the VoIP network; and a terminal signaling exchanging module operable to exchange VoIP signaling with the called terminal device according to the called IP address when the called IP address is successfully queried from the DDNS server wherein the terminal storage system comprises a plurality of history called IP addresses corresponding to a plurality of history called domain names, and the plurality of history called IP addresses are successfully queried from the DDNS server.

6. The terminal device of claim 5, wherein:

the terminal address querying module is further operable to query the DDNS server for the IP address of the default gateway when the called IP address is not successfully queried from the DDNS server; and the terminal signaling exchanging module is further operable to exchange VoIP signaling with the default gateway according to the IP address of the default gateway.

7. The terminal device of claim 5, further comprising a terminal determining module operable to determine whether the called IP address corresponding to the called domain name is found in the terminal storage system, and obtain the called IP address from the terminal storage system when the called IP address corresponding to the called domain name is found in the terminal storage system.

8. The terminal device of claim 5, wherein the terminal registration module is further operable to increase the telephone number of the terminal device by a predefined number when the telephone number of the terminal device is not successfully registered with the DDNS server, update the domain name of the terminal device according to the increased telephone number, and transmit the updated domain name and the IP address of the terminal device to the DDNS server to re-register with the DDNS server.

9. The terminal device of claim 5, wherein the terminal registration module is further operable to update the IP address of the terminal device to the DDNS server when the terminal device either reboots or resumes accessing the VoIP network.

10. The terminal device of claim 5, wherein the predefined rule includes combining one telephone number and a predefined string to form one corresponding domain name.

11. The terminal device of claim 10, wherein the terminal registration module converts a media access control (MAC) address of the terminal device into the telephone number of the terminal device according to a Hash function.

12. A method for exchanging voice over Internet protocol (VoIP) signaling of a terminal device in electronic communication with a plurality of other terminal devices, a default gateway, and a dynamic domain name service (DDNS) server in a VoIP network, each of the default gateway, the terminal device, and the other terminal devices transmitting a domain name and an IP address of each of the default gateway, the terminal device, and the other terminal devices to the DDNS server to register with the DDNS server, the method comprising:

the terminal device receiving a called telephone number of a called terminal device inputted by a user;

the terminal device generating a called domain name corresponding to the called telephone number according to a predefined rule;

the terminal device querying the DDNS server for a called IP address that corresponds to the called domain name, wherein the called IP address is successfully queried from the DDNS server when the called terminal device is one of the other terminal devices in the VoIP network, and is not successfully queried from the DDNS server when the called terminal device is not in the VoIP network;

the terminal device exchanging VoIP signaling with the called terminal device according to the called IP address when the called IP address is successfully queried from the DDNS server; and the terminal device providing a terminal storage system comprising a plurality of history called IP addresses corresponding to a plurality of history called domain names, wherein the plurality of history called IP addresses are successfully queried from the DDNS server.

13. The method of claim 12, further comprising:

the terminal device querying the DDNS server for the IP address of the default gateway when the called IP address is not successfully queried from the DDNS server; and the terminal device exchanging VoIP signaling with the default gateway according to the IP address of the default gateway.

14. The method of claim 12, further comprising:

the terminal device determining whether the called IP address corresponding to the called domain name is found in the terminal storage system; and the terminal device obtaining the called IP address from the terminal storage system when the called IP address corresponding to the called domain name is found in the terminal storage system.

* * * * *